United States Patent [19]

Schmid

[11] Patent Number: 4,995,160
[45] Date of Patent: Feb. 26, 1991

[54] APPARATUS FOR MACHINING AXIALLY SYMMETRICAL WORKPIECE SURFACES

[75] Inventor: Karlheinz Schmid, Nürtingen, Fed. Rep. of Germany

[73] Assignee: Gebr. Heller Maschinenfabrik GmbH, Nürtingen, Fed. Rep. of Germany

[21] Appl. No.: 308,827

[22] Filed: Feb. 9, 1989

[30] Foreign Application Priority Data

Feb. 13, 1988 [DE] Fed. Rep. of Germany ....... 3804502

[51] Int. Cl.$^5$ .......................... B23C 3/06; B23Q 3/157
[52] U.S. Cl. ..................................... 29/568; 29/27 C; 409/199; 409/232; 409/236; 409/268; 409/287
[58] Field of Search ............... 29/37 C, 568; 409/199, 409/200, 233, 234, 236, 144, 213, 217, 206, 207, 231, 232, 248, 256, 262, 263, 265, 267, 268, 287, 80; 83/499, 504, 665

[56] References Cited

U.S. PATENT DOCUMENTS

| 4,309,134 | 1/1982 | Schmid | 409/199 X |
| 4,536,111 | 8/1985 | Kielma | 409/234 X |
| 4,630,979 | 12/1986 | Roux | 409/232 |

*Primary Examiner*—Z. R. Bilinsky
*Attorney, Agent, or Firm*—Robert W. Becker & Associates

[57] ABSTRACT

An apparatus for machining axially symmetrical workpiece surfaces. The apparatus includes two vises for the workpiece that is to be machined, and two headstocks, each of which has an arbor for a respective tool, with the two tools being aligned with one another. The ends of the two tools that face one another are supported against one another in such a way that the tools can be shifted axially relative to one another.

28 Claims, 7 Drawing Sheets

APPARATUS FOR MACHINING AXIALLY SYMMETRICAL WORKPIECE SURFACES

BACKGROUND OF THE INVENTION

The present invention relates to an apparatus for machining axially symmetrical workpiece surfaces. The apparatus includes two vises for the workpiece that is to be machined, and two headstocks, each of which has an arbor for a respective tool, with the two tools being aligned with one another.

With heretofore known apparatus of this general type, the tools can be installed and removed only with great effort. In so doing, considerable manual operations are necessary, which lead to long downtime periods for the apparatus.

It is therefore an object of the present invention to provide an apparatus of the aforementioned general type with which the tools can be rapidly and automatically installed and removed.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
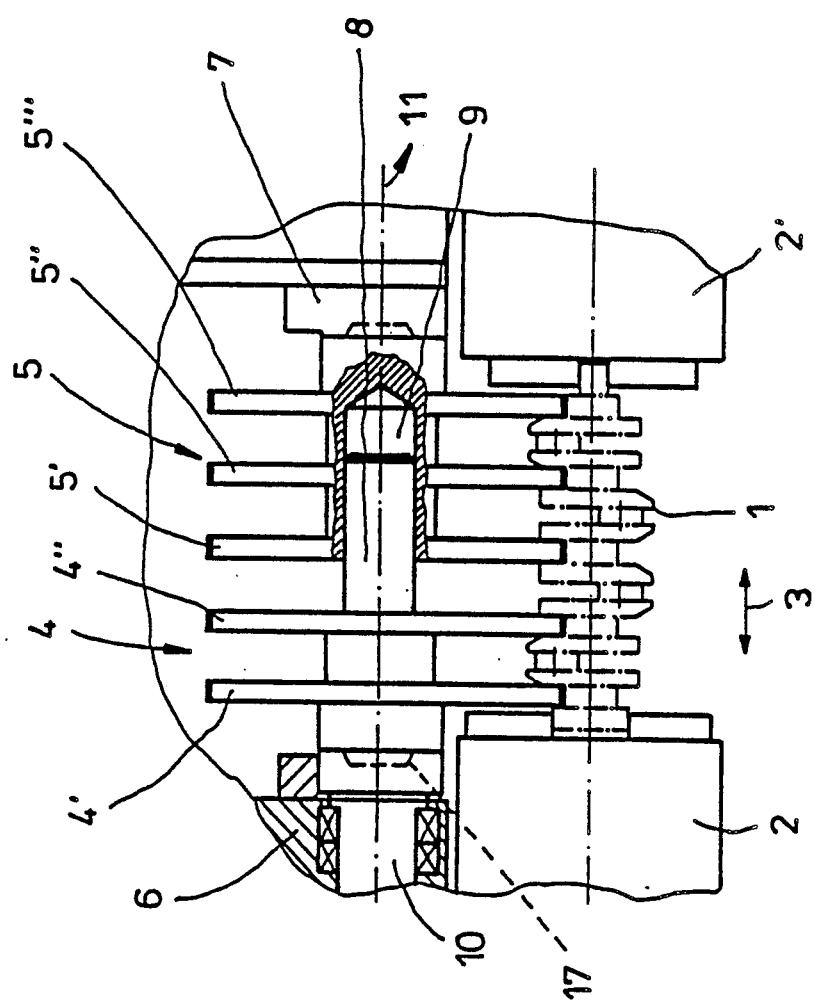
FIG. 1 is a partially cross-sectioned view of one exemplary embodiment of the inventive apparatus, in which is secured a crankshaft that is to be machined.

The apparatus of the present invention is characterized primarily in that the two tools are supported against one another at their facing ends, and in that the tools can be shifted axially relative to one another.

Since the tools of the inventive apparatus can be shifted axially relative to one another, these tools can be rapidly and automatically removed and exchanged with a suitable loading mechanism. For removal, the tools are pushed together to such an extent that they are released from the arbors and can be automatically removed from the apparatus. For installation, the tools are then correspondingly extended or moved apart in an axial direction. The downtimes during removal and replacement of the tools can thus be kept to a minimum.

Further specific features of the present invention will be described in detail subsequently.

DESCRIPTION OF PREFERRED EMBODIMENTS

Referring now to the drawings in detail, the apparatus that is described subsequently serves for the machining of crankshafts, rods, camshafts, transmission shafts, etc. In the following description, the inventive apparatus will be explained in conjunction with the machining of a crankshaft.

FIG. 1 shows an apparatus in which the two ends of the crankshaft 1 that is to be machined are rotatably held in a known manner in vises 2, 2'. During the machining operation, the crankshaft 1 rotates about the axis of the support that is then to be machined. The vises 2, 2' are each adjustable in a known manner in the direction of the arrow 3.

To machine the support of the crankshaft 1, and also to machine the side walls of the crankshaft, the apparatus is provided with two tool sets 4, 5, which are employed in a broaching operation and a turning operation. In the illustrated embodiment, the tool set 4 has two individual tools 4', 4'', and the tool set 5 has three individual tools 5', 5'', 5'''. The tool sets 4 and 5 can preferably be rotatably driven independently of one another. The headstocks 6, 7 of the tool sets 4, 5 can be shifted in an axial direction as well as in a direction toward the workpiece.

The tool sets 4, 5 are embodied in such a way that their individual tools 4', 4'', 5', 5'', 5''' simultaneously carry out a machining on the crankshaft 1. In the embodiment illustrated in FIG. 1, the individual tools machine the main support or bearing of the crankshaft 1. During the turning broaching operation, the two tool sets 4, 5 are advantageously rotated in the same direction and at the same speed. However, it is, of course, also possible to operate the two tool sets at different speeds and/or in opposite directions.

The tool set 4 is provided with a spindle 8 that extends axially beyond the last individual tool 4''. The spindle 8 has a circular cross-sectional configuration, and extends into a corresponding central recess 9 of the other tool set 5. As a result of this construction, the two tool sets 4, 5 are supported against one another, so that no additional bearing is needed for support. As a result, the inventive apparatus has a structurally simple construction. Since no additional bearings are needed, the tool sets 4, 5 can be rapidly and even automatically exchanged or replaced.

Figure 2:
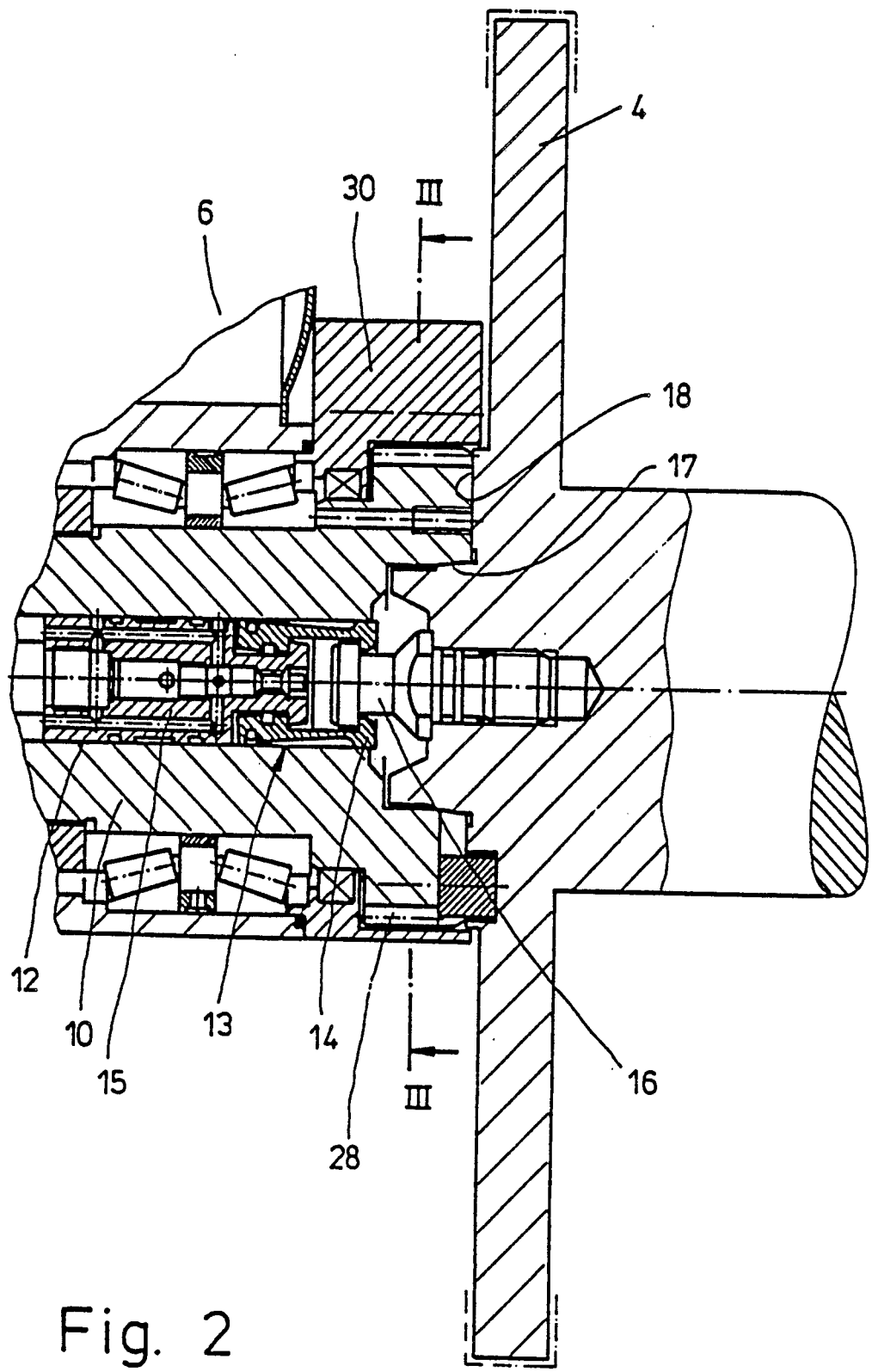
FIG. 2 is an enlarged cross-sectional view showing the securement of a tool of the inventive apparatus.

The tool arbor 10 is provided with a central through-passage 12 (FIG. 2) in which is accommodated in a known manner a chucking device 13 for the tool 4. The chucking device 13 has clamping members 14 that, via a spreader bar 15 that is axially displaceable in the through-passage 12, can be displaced out of a release position into a clamping position. In the clamping position, as illustrated in FIG. 2, the clamping members 14 grasp a draw-in bolt 16, the free end of which is provided with a collar. The free ends of the clamping members 14 grasp in a known manner behind this collar. By means of the draw-in bolt 16, the tool 4 is pulled against the arbor 10 in such a way that it rests flat against the end face 18. To provide a centering effect, the tool 4 is provided with a short taper or conical member 17 that extends into a conical receiving part of the arbor 10.

By means of the tool sets 4, 5, the workpiece can be machined not only in a turning operation but also in a turning operation. During machining in a turning operation, the tool set 4 or 5 is secured in position relative to its headstock 6 or 7. This will be described in detail for the tool 4 with the aid of FIGS. 2 and 3. The arbor 10 is provided with outer teeth 28 (FIG. 3) into which extends at least one locking member 29, which is accommodated in the housing 30 of the headstock 6. In order even during high loads during the turning operation to achieve a satisfactory and reliable locking, a plurality of locking members 29 are preferably accommodated in the housing 30. In the illustrated embodiment, four locking members 29 are provided, with two being disposed on each side diametrically across from one another. The locking members 29 are embodied as pistons that are acted upon on one side, and that on that end face thereof that faces the arbor 10 are respectively provided with a tooth 31 that engages the teeth 28 of the arbor 10. The locking members 29 are disposed in cylindrical chambers 32 that are provided in the housing 30, extend radially relative to the arbor 10, and are closed off to the outside. Opening into each of the cylindrical chambers 32 is a pressure medium line 33 via which the pressure medium that serves to act upon the locking member 29 is conveyed into the cylindrical chambers 32. All of the pressure medium lines 33 are connected to a common feed line 34.

The arbor 11 can be secured in position relative to the headstock 7 in the same manner with such locking members.

Figure 3:
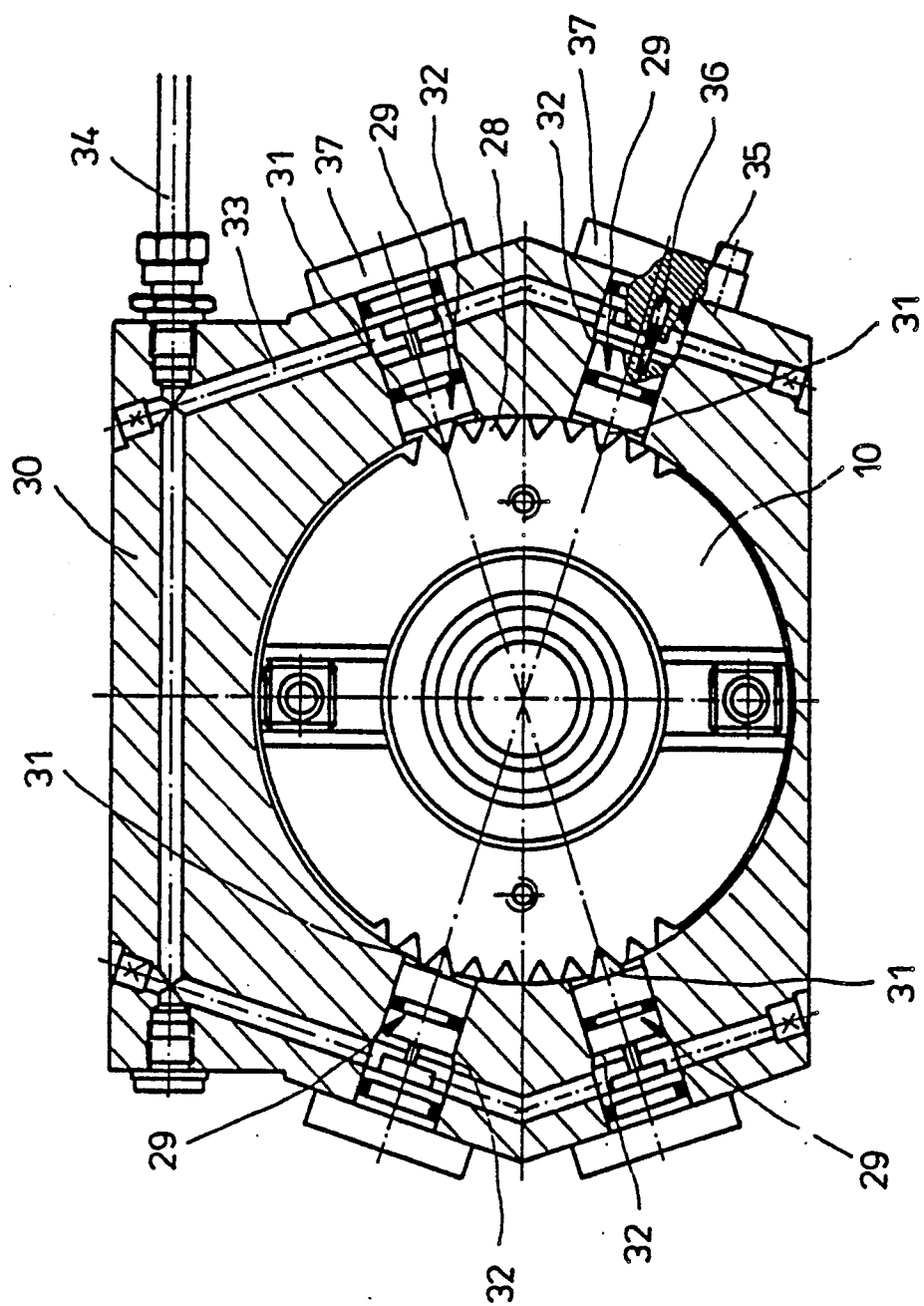
FIG. 3 is a cross-sectional view taken along the line III—III in FIG. 2.

In order to reliably prevent the locking members 29 from turning in the cylindrical chambers 32, that side of the locking members 29 remote from the tooth 31 is provided with a projecting, off-center pin 35 that is guided in a blind hole 36 of a closure member 37 that closes off the cylindrical chamber 32. FIG. 3 shows the locking members 29 in their secured position in which their teeth 31 engage in the outer teeth 28 of the arbor 10. By means of the securement of the arbors 10 and 11, the respective tool is held in an extremely stable and non-oscillating manner during the turning operation, so that the tool is subjected to relatively little wear and assures a high machining precision.

To release the arbors 10 and 11, it is merely necessary to relieve the pressure of the locking members 29. By turning the arbors 10 and 11, the relieved locking members 29 are then pushed back into the cylindrical chambers 32.

Figure 4:
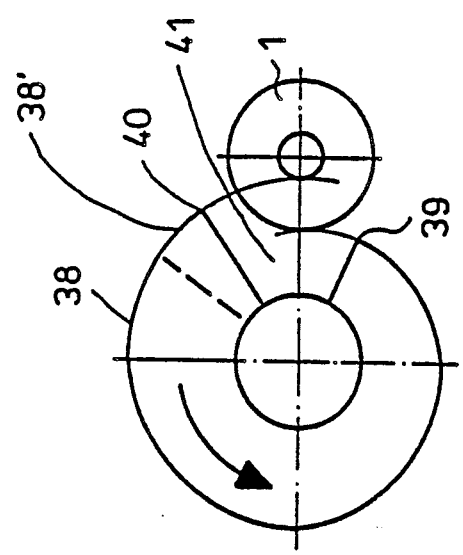
FIG. 4 is a schematic side view of a rotary broach embodiment of a tool of the inventive apparatus with which a crankshaft is machined.

FIG. 4 shows one embodiment of the individual tools of the tool sets 4,5. In this embodiment, the individual tool is provided with a helically extending cutting edge arrangement 38 that extends over an angular range of approximately 330°. With the cutter portion 38', recesses can be produced in the crankshaft 1, as will be described subsequently. The tool is provided with a sector-like portion 41 between the starting point 39 and the end point 40 of the cutting edge arrangement 38.

Figure 5:
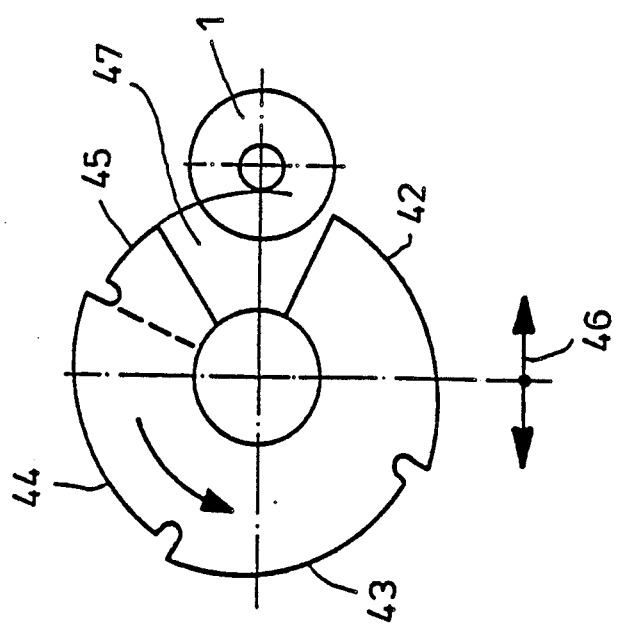
FIG. 5 is a schematic side view of a sectored tool embodiment of the inventive apparatus.

As shown in the embodiment illustrated in FIG. 5, in place of the continuously helically extending cutting edge arrangement 38, the individual tool of each tool set 4,5 can also have a plurality of cutter portions 42 to 45 in which the cutting edges extend helically. The tool is thus divided into separate segments. With the helically extending cutter portions 42 to 44, the crankshaft 1 can be machined in a turning broaching operation, with the tool rotating only about its axis and not having to be fed to the crankshaft due to the helically extending cutter portions 42 to 44. It should be noted, however, that the crankshaft 1 can also be machined in a turning operation with the cutter portions 42 to 44. However, in this case the tool must be fed relative to the crankshaft during the operation (see arrow 46). With the cutter portion 45, which in the illustrated embodiment is shorter than the cutter portions 42 to 44, recesses are again produced in a turning operation. This individual tool is also provided with a sector-like portion 47.

The individual tool of FIG. 5 enables, with a small diameter, a large removal capacity. If, for example, a turning broaching operation is carried out on the crankshaft 1 with the cutter portion 42, the tool is turned back when the end point of cutter portion 42 is reached. In order now to again undertake a removal operation, the tool must be fed in the direction of the arrow 46 relative to the crankshaft 1. Material can then again be removed with the cutter portion 42 in a turning broaching operation.

Figure 6:
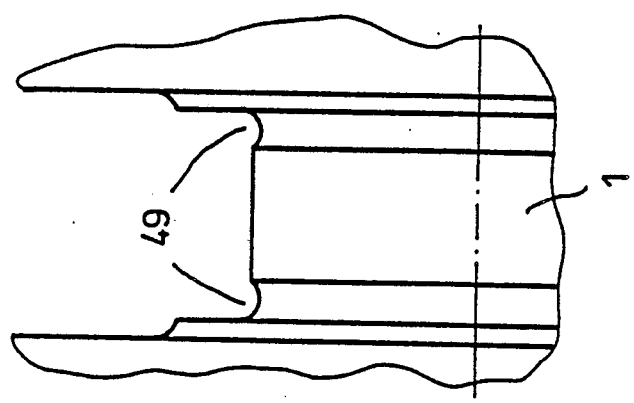
FIG. 6 is a view that shows recesses produced in a crankshaft with the inventive apparatus.

FIG. 6 shows a portion of the crankshaft 1. With the tool sets 4,5, recesses 49 can be produced in the bearing of the crankshaft 1. These recesses can be produced via a turning broaching operation or a turning operation. If the machining is accomplished in a turning broaching operation, the tool sets 4,5 rotate in the direction of the arrows in FIGS. 4 and 5, with the crankshaft 1 also being rotated. Since with the tools of FIGS. 4 and 5 the respective cutting edges extend helically, it is not necessary to feed or advance the tools during the turning broaching operation. Merely with the tool of FIG. 5 is it necessary to feed in the direction of the arrow 46 if after a pass of one of the cutter portions 42 to 44, a further turning broaching operation is to be carried out with the same cutter portion.

The described tools can also be used in a turning operation. In this case, the respective tool is locked in such a way via the arbors 10 or 11 with the locking members 29 that it cannot rotate, as was described in conjunction with FIG. 3. During the turning operation, the crankshaft 1 is rotated about the axis of the bearing.

Figure 7:
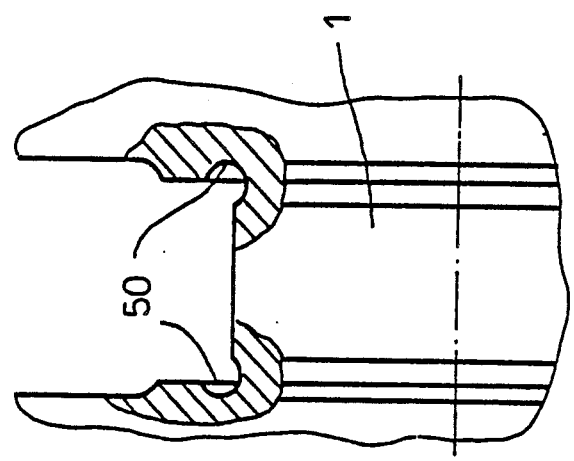
FIG. 7 is a view that shows recesses and undercuts produced in a crankshaft with the inventive apparatus.

With the described tools, it is also possible to produce undercuts 50 on the crankshaft 1 (FIG. 7). To produce these undercuts 50, at least one of the individual tools 4,4', or 5', 5", 5''' of the tool sets 4,5 is provided with an appropriate cutter arrangement. With the tool of FIG. 4, the cutter portion 38' is provided for this purpose, whereas with the tool of FIG. 5, the cutter portion 45 is provided herefor. The remaining individual tools of the tool sets 4,5 that are not needed for producing such undercuts are not provided with the cutter portions 38' or 45. Accordingly, the sector-like portions 41 or 47 of these individual tools extend into this region (shown by dashed lines in FIGS. 4 and 5). Thus, the sector-like portions 41 and 47 of these individual tools are greater than with the individual tools that are used to produce the undercuts 50. To produce the undercuts 50, the tool sets 4,5 are fed radially in a direction toward the crankshaft 1. The larger portions 41, 47 are wide enough in the circumferential direction that during rotation of the respective tool set 4 or 5 during production of the undercuts 50 these portions 41, 47 do not come into contact with the crankshaft 1. As soon as the tool sets 4, 5 are fed or advanced, that tool set that is provided with the individual tool for producing the undercut is aligned in the circumferential direction relative to the crankshaft that is to be machined. During the turning operation for producing the undercuts 50, both tool sets 4,5, since they are supported against one another, are fed together radially relative to the crankshaft, and that tool set that is provided with the individual tool for producing the undercuts is in addition shifted axially relative to the other tool set. As a result, the undercut 50 can be produced in a very simple manner on the crankshaft 1 As soon as one undercut 50 is produced, the appropriate tool set is shifted in the opposite direction and the other undercut is then produced in the same manner by a turning operation. It is also possible to mount both headstocks 6,7 on a common carriage. The two tool sets 4,5 are then shifted together axially.

Figure 8:
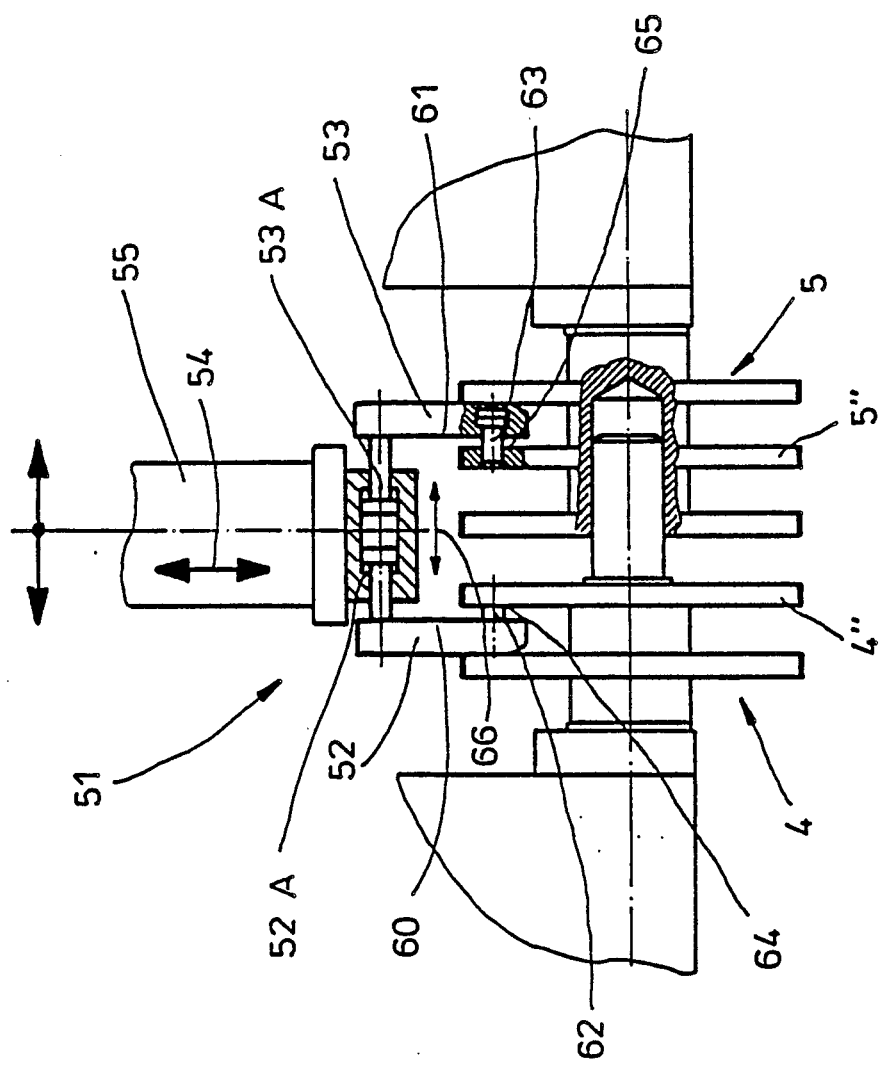
FIG. 8 is a partially cross-sectioned view of a portion of a loading device of the inventive apparatus.

The tool sets 4,5 can be easily installed and removed from the apparatus. As was explained in conjunction with FIG. 2, the tool sets 4,5 can be secured to the respective arbor 10,11 via the draw-in bolts 16. To remove the tool sets 4,5, the chucking devices 13 are shifted axially to the front in the arbors 10, 11 in a known manner, so that the clamping members 14 can release the draw-in bolts 16. During this axial displacement, the draw-in bolt 16, and hence also the respective tool set 4,5, is expediently shifted slightly away in an axial direction relative to the arbor 10 or 11. Thus, via loosening of the chucking device 13, the tool set 4 or 5 is shifted axially to such an extent that its short taper 17 (FIGS. 1 and 2) is released from the corresponding receiving opening of the arbor 10,11. Subsequently, the tool sets are shifted axially in a direction toward one another via a gripping device 51 (FIG. 8) until the tool sets are completely free of the arbors 10,11. The gripping device 51 has two gripper arms 52 and 53 that can be shifted relative to one another and that are provided on a support element 55 that can be shifted in the direction of the arrow 54 transverse to the tool sets 4,5. The gripper arms 52,53 can be shifted in the direction of the arrow 66 via piston/cylinder arrangements 52A, 53A.

The gripping device 51 is fed in the direction of the arrow 54 to the tool sets 4,5 in such a way that the gripper arms 52, 53 can enter the individual tools of the two tool sets in an unobstructed manner. In order to be able to displace the tool sets 4,5 axially in a direction toward one another after the loosening of the draw-in bolts 16, the gripper arms 52, 53 are aligned relative to one another in such a way that in the illustrated embodiment they rest against the individual tools 4″ and 5″. By shifting the gripper arms 52, 53, the tool sets 4,5 can then be completely loosened or removed from the arbors 10,11.

Near their free ends, and on the sides 60 and 61 that face one another, the gripper arms 52,52 are provided with perpendicularly extending, preferably hydraulically displaceable, pins 62 and 63 that in the described position extend into bores 64 and 65 in the individual tools 4″, 5″. The gripping device 51 is then retracted, thereby taking along the two tool sets 4,5.

During installation and removal, the tool sets 4,5 are interconnected via the spindle 8. After placement of the tool sets 4,5 in the arbors 10,11, the draw-in bolts 16 of the tool sets are grasped by the chucking devices 13 that are accommodated in the spindles, and the short tapers 17 of the tool sets are pulled into the corresponding receiving openings of the arbors. The pins 62, 63 are then withdrawn from the bores 64, 65 of the tools 4″, 5″. The gripping device 51 can then again be withdrawn from the tool sets 4,5 in the direction of the arrow 54.

Loaders, cranes, or other lifting mechanisms can be used as carriers for the gripping device 51.

The present invention is, of course, in no way restricted to the specific disclosure of the specification and drawings, but also encompasses any modification within the scope of the appended claims.

What I claim is:

1. In an apparatus for machining axially symmetrical workpiece surfaces, including two vises on the same axis and receiving a workpiece between them for the workpiece that is to be machined, and two headstocks, each of which has an arbor for a respective tool, the two headstock arbors being on a common axis and each therewith holds an end portion of a respective tool therebetween, with said two tools being aligned with one another, said vise axis being parallel to said headstock axis, comprising the improvement therewith wherein:

each of said tools has two ends, with one end of one of said tools facing one end of the other of said tools, and means for installation of said facing tool ends thus being supported against one another and including cooperating facing means on the tools so that said tools can be rotated independently and shifted axially relative to one another and so that for removal said tools are pushed together to such an extent that said tools are released from the arbors and can be automatically removed from the apparatus to minimize downtimes during removal and replacement of the tools.

2. An apparatus according to claim 1, in which said cooperating facing means comprise an axially extending projection at one end of the tool thereof, with the other of said tools being supported on said projection.

3. An apparatus according to claim 2, in which the other of said tools is provided with a recess for receiving said projection of said one tool.

4. An apparatus according to claim 3, in which said tools are rotatable relative to one another so that a workpiece can be machined in both a turning milling operation and also in a turning operation.

5. An apparatus according to claim 3, in which at least one of said tools is embodied as a tool set.

6. An apparatus according to claim 5, in which at least said one tool is provided with a short taper that is adapted to be received by the associated arbor, whereby in an installed state of that tool, said tool rests against an end face of said arbor.

7. An apparatus according to claim 6, in which each of said tools is embodied as a tool set that is provided with disk-like individual tools, each of which has a sector-like cutaway portion.

8. An apparatus according to claim 7, in which at least one of said individual tools of one of said tool sets is provided with an additional cutter portion to produce undercuts on said axially symmetrical workpiece surface.

9. An apparatus according to claim 8, which includes means to radially adjust both of said tool sets in common relative to said workpiece surface, and which also includes means to axially shift at least said one tool sets for producing said undercut.

10. An apparatus according to claim 3, which includes housing means for said headstocks, and means for locking a given one of said arbors in position relative to said headstock housing means.

11. An apparatus according to claim 10, in which said locking means includes outer teeth on said arbor and at least one locking member that is accommodated in said headstock housing means and that in a locking position engages said outer teeth of said arbor.

12. An apparatus according to claim 11, which includes several locking members accommodated in said headstock housing means.

13. An apparatus according to claim 12, in which each of said locking members is formed by a piston that is adapted to be acted upon by pressure medium and that is provided with tooth means to effect said engagement with said outer teeth of said arbor.

14. An apparatus according to claim 13, in which said headstock housing means is provided with respective cylindrical chambers for said locking members; and which includes pressure medium lines that open into said chambers.

15. An apparatus according to claim 3, which includes a loading mechanism for the installation and removal of said tools.

16. An apparatus according to claim 15, in which said loading mechanism is provided with two gripper arms that are movable relative to one another.

17. An apparatus according to claim 16, in which said gripper arms are each provided with displaceable pin means that are adapted to be introduced into opening means of said tools.

18. An apparatus according to claim 3, in which said tools are provided with helically extending cutting edges.

19. An apparatus according to claim 3, in which said tools are provided with a plurality of helically extending cutter portions.

20. In an apparatus for machining axially symmetrical workpiece surfaces, including two vises on the same axis for the workpiece that is to be machined, and two headstocks each having an arbor for a respective tool, the two headstock arbors being on a common axis and each thereof holds an end portion of a respective tool therebetween, with each said tool being aligned for machining the workpiece surface, said vise axis being parallel to said headstock axis, comprising the improvement therewith wherein:

each said tool has two ends, with each said tool laterally adjoining the workpiece surface;

means for installation of the facing tool ends thus being supported and including cooperating facing means on the tools so that each said tool can be prepositioned axially relative to the working surface for a turning operation, a broaching operation or a milling operation;

housing means for said headstock, means for locking each said arbor in position relative to said headstock housing means so that during machining in the turning operation on the workpiece each said tool does not rotate, said workpiece rotating with high speed; said workpiece also being rotated during the broaching operation and also during the milling operation.

21. An apparatus according to claim 20, in which said locking means includes outer teeth on said arbor and at least one locking member that is accommodated in said headstock housing means and that in a locking position engages said outer teeth of said arbor.

22. An apparatus according to claim 21, which includes several locking members accommodated in said headstock housing means.

23. An apparatus according to claim 22, in which each of said locking members is formed by a piston that is adapted to be acted upon by pressure medium and that is provided with tooth means to effect said engagement with said outer teeth of said arbor.

24. An apparatus according to claim 23, in which said headstock housing means is provided with respective cylindrical chambers for said locking members; and which includes pressure medium lines that open into said chambers.

25. An apparatus according to claim 24, in which said several locking members collectively have a common pressure-medium feed line connected therewith.

26. An apparatus according to claim 24, in which said means for locking said arbor are secured against rotation in said cylindrical chamber respectively.

27. An apparatus according to claim 20, in which said means for locking includes a projecting pin provided as a member to secure against rotation and guided in a bore therewith.

28. An apparatus according to claim 27, in which the bore is a blind hole in a closure member that closes off said cylindrical chamber respectively.

* * * * *

UNITED STATES PATENT AND TRADEMARK OFFICE
CERTIFICATE OF CORRECTION

PATENT NO. : 4,995,160
DATED : 26 February 1991
INVENTOR(S) : Karlheinz Schmid

It is certified that error appears in the above-identified patent and that said Letters Patent is hereby corrected as shown below:

Column 2, Line 62, add -- broaching -- after "turning";

Column 6;

Claim 4, line 3, "milling" should be -- broaching --;

Claim 20, Column 2, Line 1, add -- or -- after the ",";

Line 2, cancel "or a milling operation;

Line 9, before "broaching" add -- turning--

Line 10, change "milling" to -- turning --

Signed and Sealed this

Fourth Day of August, 1992

Attest:

DOUGLAS B. COMER

*Attesting Officer*    Acting Commissioner of Patents and Trademarks